(12) United States Patent
Tucker et al.

(10) Patent No.: US 11,942,734 B2
(45) Date of Patent: Mar. 26, 2024

(54) OUTLET ASSEMBLY COMPRISING RETRACTABLE CHARGING CABLE

(71) Applicants: Brennan Tucker, Baltimore, MD (US); Joshua Olden Smith, Asheville, NC (US)

(72) Inventors: Brennan Tucker, Baltimore, MD (US); Joshua Olden Smith, Asheville, NC (US)

(*) Notice: Subject to any disclaimer, the term of this patent is extended or adjusted under 35 U.S.C. 154(b) by 318 days.

(21) Appl. No.: 17/510,822

(22) Filed: Oct. 26, 2021

(65) Prior Publication Data

US 2022/0158393 A1    May 19, 2022

Related U.S. Application Data

(60) Provisional application No. 63/115,130, filed on Nov. 18, 2020.

(51) Int. Cl.
| | | |
|---|---|---|
| *H01R 13/72* | (2006.01) | |
| *H01R 13/502* | (2006.01) | |
| *H02G 11/02* | (2006.01) | |

(52) U.S. Cl.
CPC .......... *H01R 13/72* (2013.01); *H01R 13/502* (2013.01); *H02G 11/02* (2013.01)

(58) Field of Classification Search
CPC ....... H01R 13/72; H01R 13/502; H02G 11/02
USPC .......................................................... 439/501
See application file for complete search history.

(56) References Cited

U.S. PATENT DOCUMENTS

| | | | | |
|---|---|---|---|---|
| 6,304,476 B1* | 10/2001 | Liao | ............... | H02G 11/02 363/146 |
| 6,325,665 B1* | 12/2001 | Chung | ............... | H02G 11/02 439/501 |
| 7,654,855 B2* | 2/2010 | Liao | ............... | H01R 13/60 439/441 |
| 8,137,129 B2* | 3/2012 | Woods | ............... | B60R 16/0215 439/501 |
| 8,415,920 B2* | 4/2013 | Liao | ............... | H01R 31/065 439/174 |
| 9,455,543 B2* | 9/2016 | Liao | ............... | H01R 27/02 |
| 9,876,324 B2* | 1/2018 | Gorin | ............... | H01R 25/006 |
| 2010/0315036 A1* | 12/2010 | Liao | ............... | H02J 7/0042 320/107 |

(Continued)

FOREIGN PATENT DOCUMENTS

| | | | | |
|---|---|---|---|---|
| DE | 202009013645 U1 * | 4/2010 | ............ | H01R 13/72 |
| DE | 202019106970 | * | 1/2020 | ......... H01R 13/6658 |

(Continued)

*Primary Examiner* — Peter G Leigh
(74) *Attorney, Agent, or Firm* — Ashley D. Johnson; Dogwood Patent and Trademark Law (57) ABSTRACT

The invention is directed to an improved outlet assembly that provides at least one standard electrical socket in addition to one or more retractable charging cables. Most homes and buildings currently use wall outlets having only AC sockets. Advantageously, the disclosed outlet assembly also includes access to one or more retractable charging cables. Each cable is operably connected to a port configured on the interior of the assembly. Assembly therefore conveniently provides one or more retractable cables that allow a variety of mobile devices to be charged. Advantageously, the user does not need a separate cable, adapter, charger, and/or power supply.

20 Claims, 11 Drawing Sheets

(56) References Cited

U.S. PATENT DOCUMENTS

| | | | |
|---|---|---|---|
| 2015/0146348 A1* | 5/2015 | Liao | H02J 7/0044 |
| | | | 361/679.01 |
| 2015/0263447 A1* | 9/2015 | Liao | H01R 27/02 |
| | | | 439/701 |
| 2016/0254628 A1* | 9/2016 | Liao | H01R 31/065 |
| | | | 439/535 |
| 2017/0324200 A1* | 11/2017 | Gorin | H01R 25/006 |
| 2018/0358767 A1* | 12/2018 | Brower | H01R 12/7082 |

FOREIGN PATENT DOCUMENTS

| | | | | |
|---|---|---|---|---|
| EP | 3270470 A2 * | 1/2018 | | H01R 13/60 |
| GB | 2525754 A * | 11/2015 | | H01R 24/78 |
| WO | WO-2018068109 A1 * | 4/2018 | | B60R 16/037 |
| WO | WO-2019180620 A1 * | 9/2019 | | H01F 27/2804 |

* cited by examiner

Fig. 8

OUTLET ASSEMBLY COMPRISING RETRACTABLE CHARGING CABLE

CROSS-REFERENCE TO RELATED APPLICATIONS

This application claims priority to U.S. Provisional Patent Application No. 63/115,130 filed Nov. 18, 2020, the entire content of which is hereby incorporated by reference herein.

TECHNICAL FIELD

The presently disclosed subject matter relates generally to a wall outlet assembly that includes a retractable charging cable (e.g., a USB cable) for use with a wide variety of electronic devices.

BACKGROUND

The use of mobile electronic devices (such as smart phones, laptop computers, tablets, and the like) continues to increase in popularity throughout the world. These mobile devices are typically charged by connecting the device to an adaptor plugged into a conventional AC wall outlet. Although the adaptors effectively charge the mobile device, they are bulky and inconvenient in design. In addition, the user is often required to carry separate adaptors, cables, and associated accessories to charge each individual device in their possession. For example, the charging cable for a phone is typically different from that of a PDA. During charging, the adaptor and cables can be awkward and cumbersome, with hanging cords that create safety and damage risks for the user and the device. Further, conventional adapters are easily damaged (e.g., due to dropping, exposure to water, etc.), requiring them to be regularly replaced, which can be expensive.

While not in use, charging adaptors and cables commonly clutter floors, desks, and countertops in the surrounding environment. Further, if the user forgets a particular adaptor cable, the electronic device cannot be charged with conventional AC wall outlets alone. It would therefore be beneficial to provide an improved wall outlet assembly that enables electronic devices to be charged without the user having to provide a conventional adaptor.

SUMMARY

In some embodiments, the presently disclosed subject matter is directed to an outlet assembly. Particularly, the outlet assembly comprises a housing defined by an interior, a front face comprising one or more socket apertures and one or more insert apertures, and a bottom face comprising one or more supports spaced to create a channel therebetween. The assembly includes a socket module positioned within the interior of the housing, defined by one or more AC sockets and a sidewall comprising one or more USB ports, wherein each socket is adjacent to a corresponding socket aperture. The assembly further includes an insert positioned within the interior of the housing, defined by one or more USB cables wound about a spool, wherein each insert comprises a front face adjacent to a corresponding insert aperture, and wherein each insert is positioned on top of the housing supports. Each USB cable includes a plug that is operably connected to a socket module USB port via the housing channel to provide power to the USB cable. Each USB cable also includes a connector end configured to releasably attach to a mobile device that is positioned external to the housing, extending through an insert front face slot.

In some embodiments, the housing is positioned within a wall, such that that the housing front face is flush with the wall and the remainder of the housing is concealed within an interior of the wall.

In some embodiments, each AC socket provides about 110 volts of electricity.

In some embodiments, the USB port is a standard USB port, a mini-USB port, a micro-USB port, or combinations thereof.

In some embodiments, each USB port operates independently from each AC socket, each other USB port, or both.

In some embodiments, each spool is configured to be independently attached or removed from the housing assembly.

In some embodiments, each USB port supplies about 1-5 volts of electricity. In some embodiments, the USB cable has a length of about 10 feet.

In some embodiments, each spool is a retractable spool that allows a length of the associated USB cable to be extended from the spool and retracted back to the spool.

In some embodiments, the spool includes a locking mechanism that enables the USB cable to be locked in an extended and unwound configuration.

In some embodiments, the locking mechanism comprises a toothed wheel and a spring.

In some embodiments, the spool includes a rotating circuit board.

In some embodiments, the presently disclosed subject matter is directed to a method of charging a mobile device with the disclosed outlet assembly. Particularly, the method comprises connecting a charging input of the mobile device with a USB connector from the outlet assembly. The device can be charged for a desired amount of time. The USB connector is then removed from the charging input of the mobile device, whereby the mobile device is charged.

In some embodiments, the mobile device is selected from a smart phone, a tablet, a gaming device, a PDA, or combinations thereof.

In some embodiments, a plurality of mobile devices can be simultaneously charged.

In some embodiments, the USB connector can be extended up to about 10 feet from the outlet assembly.

In some embodiments, the outlet assembly is configured in a wall.

The previous summary and the following detailed description are to be read in view of the drawings, which illustrate some (but not all) embodiments of the presently disclosed subject matter.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−0.1-20% from the specified amount, as such variations are appropriate in the disclosed packages and methods.

Figure 1A:
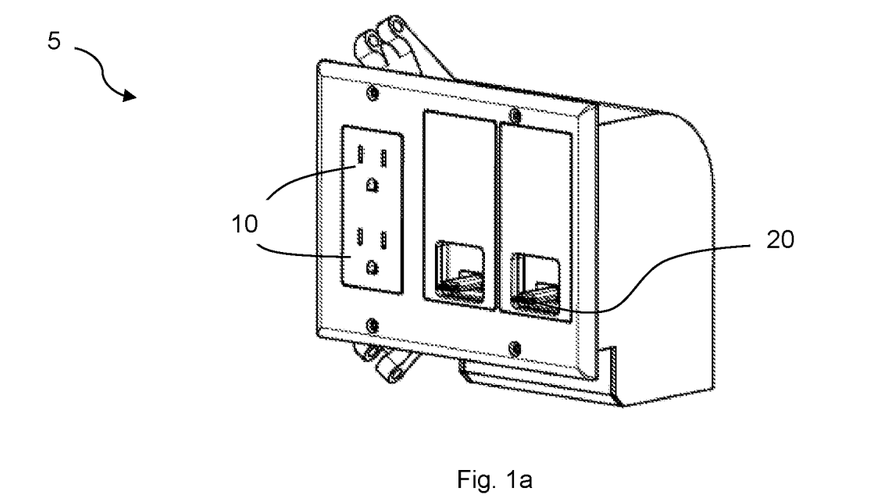
FIG. 1a is a perspective view of an outlet assembly in accordance with some embodiments of the presently disclosed subject matter.

The presently disclosed subject matter is generally directed to an improved outlet assembly that provides electrical power with at least one standard electrical socket in addition to one or more retractable USB charging cables. As illustrated in FIG. 1a, assembly 5 includes a conventional outlet with a series of sockets 10. The term "socket" refers to an electronic component having interconnection elements suitable for making electrical connection to another electronic component, such as through a plug. Sockets 10 therefore provide electrical power to a corresponding device requiring AC input via a plug that is inserted into the socket (e.g., lamp, television, blender, etc.). Most homes and buildings currently use wall outlets having only AC sockets. Advantageously, assembly 5 also includes access to one or more retractable charging cables 20 (e.g., USB charging cables)

Figure 1B:
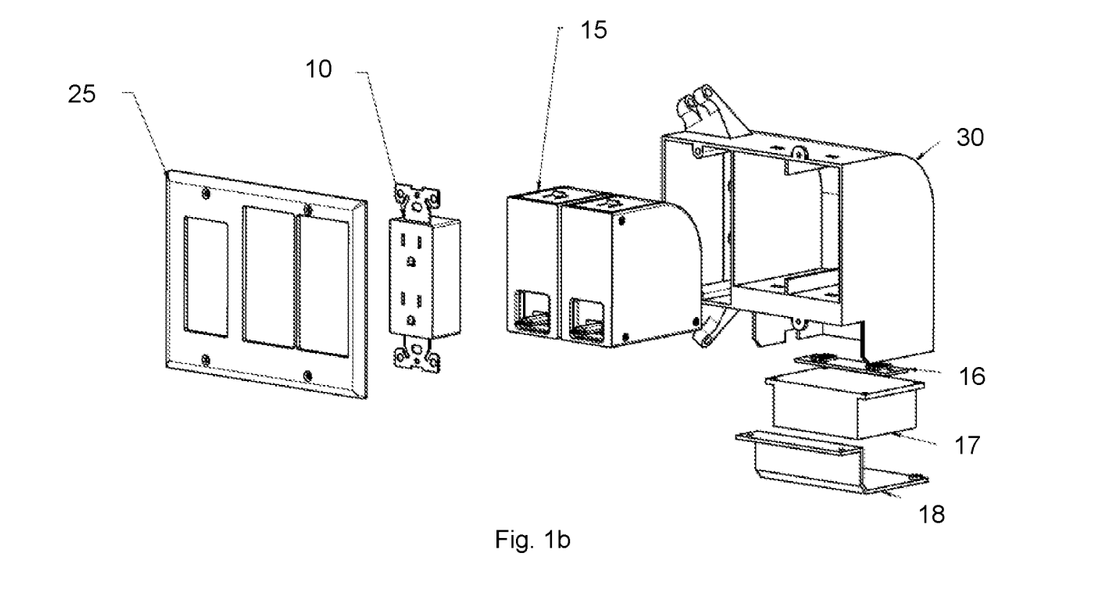
FIG. 1b is an exploded view of the assembly of FIG. 1a in accordance with some embodiments of the presently disclosed subject matter.

FIG. 1b is an exploded view of the assembly of FIG. 1 showing faceplate 25, that provides an aesthetic appearance to the assembly, hiding at least a portion of the electrical components from view. The assembly also includes socket 10, which can be a duplex receptacle, single receptacle, triple receptacle, etc. Housing 30 is also included, configured to accommodate at least one charging cable spool insert 15. Additional components can be included, such as (but not limited to) printed circuit board assembly 16. The term "printed circuit board assembly" refers broadly to a sandwich structure of conducting and insulative layers that function to affix electronic components in designated locations on the outer layers and provide reliable electrical connections between the terminals of the components in a controlled manner.

In some embodiments the assembly can further include AC/DC converter 17 as illustrated in FIG. 1b. The term "AC/DC converter" refers to a device that converts input AC into DC and then outputs it. The assembly can also include housing lid 18 that can be configured in any suitable size and/or shape. The lid shields the interior components of the assembly to ensure that the wiring, etc. are not exposed in full contact with the support wall upon which the assembly in mounted in accordance with fire safety regulations.

As described in detail herein below, each charging cable 20 is operably connected to a port configured on the interior of the assembly (e.g., a USB charging cable can be connected to a USB port on a phone although any type of charging cable/port can be used). Assembly 5 therefore allows attachment of a conventional AC plug, as well as conveniently provides one or more retractable cables that allow a variety of mobile devices to be charged. Advantageously, the user does not need a separate charging cable, adapter, charger, and/or power supply. Rather, integrated charging cable 20 mates directly to the device of a user for charging.

Figure 2A:
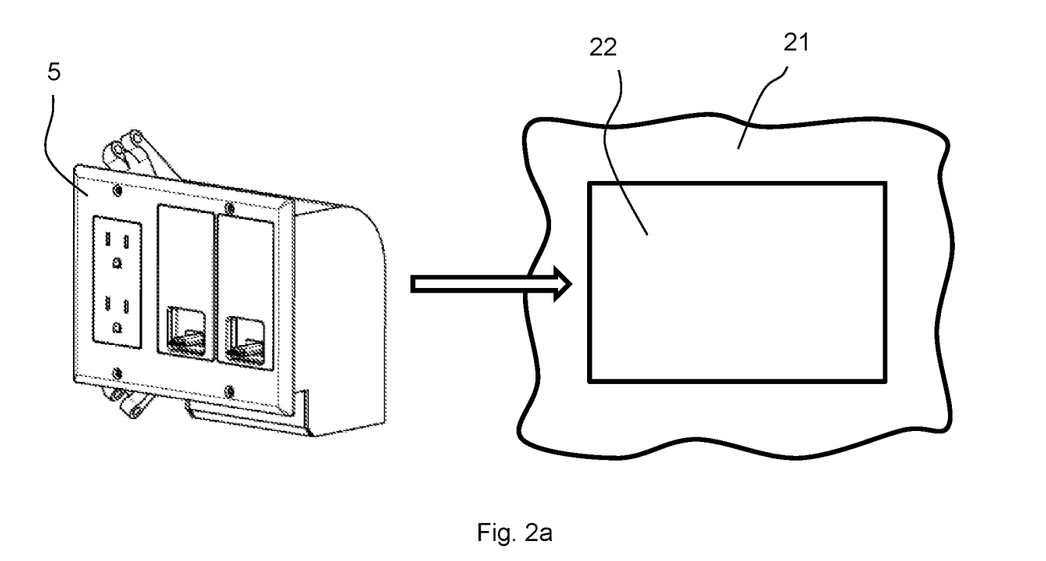
FIG. 2a is a perspective view of the insertion of an outlet assembly into a wall aperture in accordance with some embodiments of the presently disclosed subject matter.
Figure 2B:
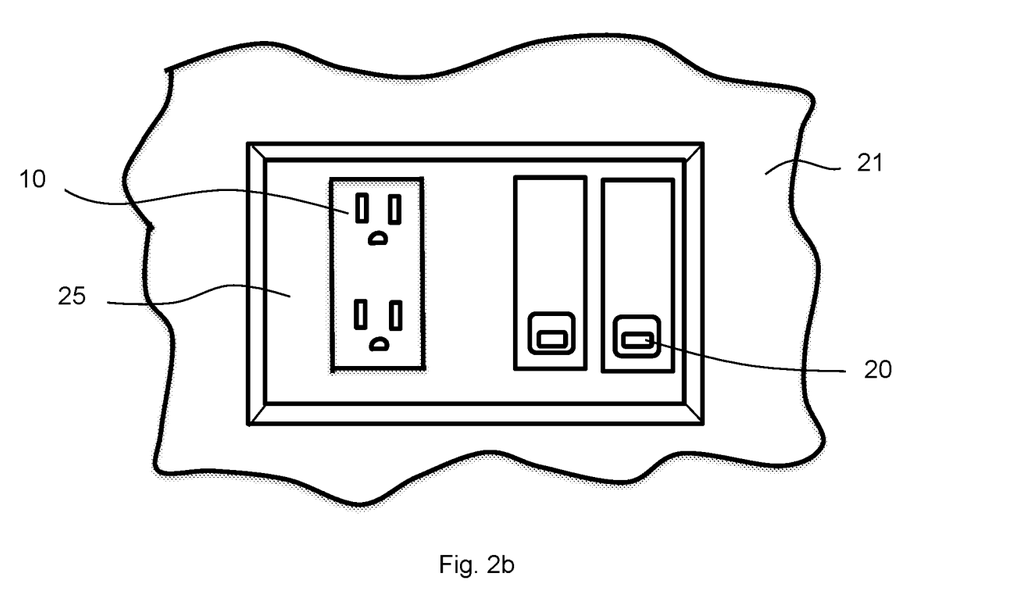
FIG. 2b is a front plan view of an outlet assembly after installation in a wall in accordance with some embodiments of the presently disclosed subject matter.

Assembly 5 can be mounted in a predetermined location on wall 21 (e.g., the wall of a home or business) as shown in FIGS. 2a and 2b. For example, wall 21 can be a location that has wired connections to the building's AC power grid, a generator, a transformer, or the like. The wall provides the support structure for assembly 5, and functions to hide most or all of the assembly components. Wall 21 can be a structural portion of a building or can be a section of equipment, such as a power supply. As shown in FIG. 2a, aperture 22 is formed in wall 21 to accept the disclosed outlet assembly. The building's AC wiring is connected to the outlet at corresponding connection terminals, as would be known in the art. Once installed, the assembly is flush with wall 21, such that only faceplate 25 is visible, as illustrated in FIG. 2b. The electrical sockets and USB cable charging ends are also visible, as discussed below. The remainder of the assembly is configured within aperture 22 on the interior of the wall.

Figure 3A:
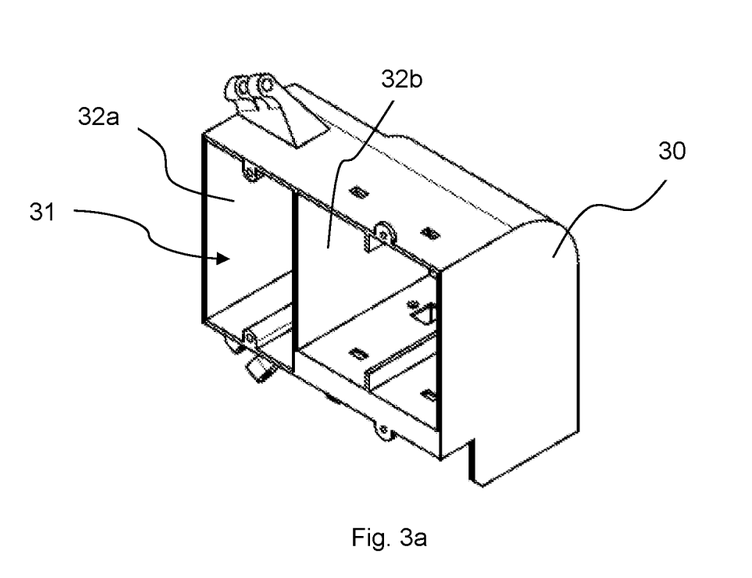
FIG. 3a is a front perspective view of an outlet assembly housing in accordance with some embodiments of the presently disclosed subject matter.

FIG. 3a illustrates one embodiment of housing 30 that retains the various components of assembly 5. The term "housing" refers to any structure that can structurally support and/or conceal one or more members of the disclosed outlet assembly. As shown, housing 30 includes one or more walls that surround interior 31. The walls create first and second compartments 32a and 32b. The first and second compartments can be sized and shaped to include one or more sockets 10 and inserts 15, respectively. It should be appreciated that the first compartment (e.g., a socket module) can be sized and shaped to accommodate a single socket, two sockets, three sockets, or more. Similarly, the second compartment can be sized and shaped to accommodate at least one spool insert 15 (e.g., a single spool, two spools, more than two spools).

Figure 3B:
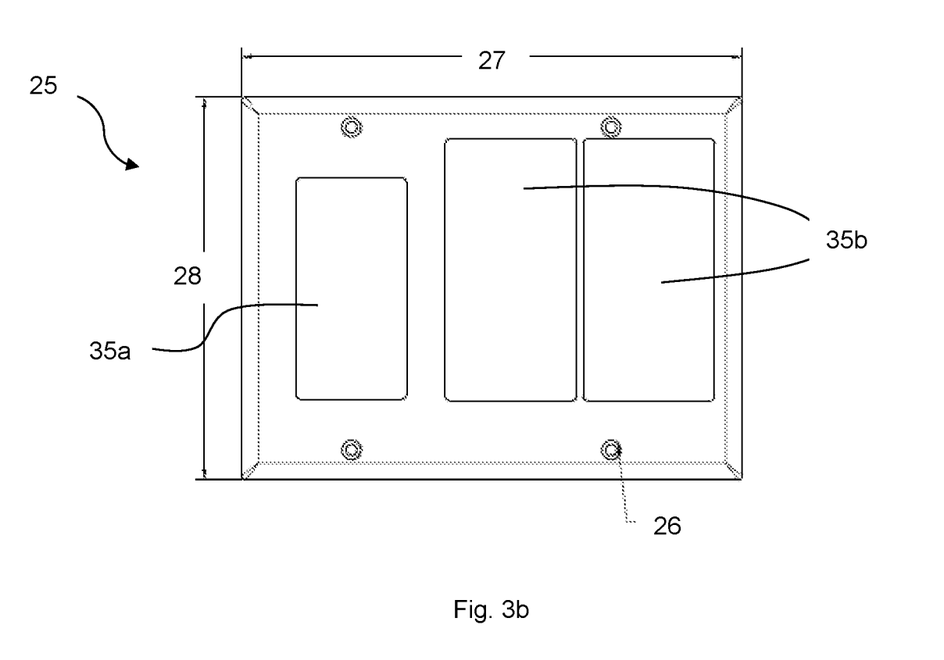
FIG. 3b is a front plan view of a faceplate in accordance with some embodiments of the presently disclosed subject matter.
Figure 3C:
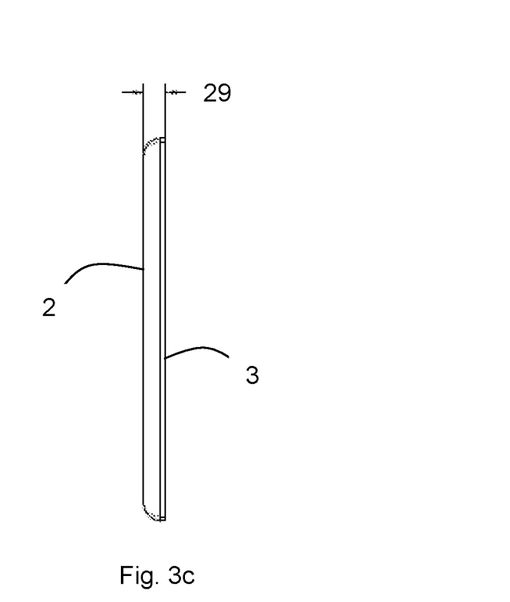
FIG. 3c is a side plan view of the faceplate of FIG. 3b in accordance with some embodiments of the presently disclosed subject matter.

The front face of the housing releasably attaches to faceplate 25 comprising one or more openings. One example of a faceplate is shown in FIGS. 3b and 3c. As shown, the faceplate can include at least one socket opening 35a sized and shaped to accommodate an electrical socket. In addition, the faceplate can include a plurality of insert openings 35b that are sized and shaped to accommodate insert 15, as described below. Typically, faceplate 25 is held in place with screw 26 or any other fastener capable of mounting the faceplate to housing 30 (e.g., magnets, snap-fit, pressure-fit, and the like). The faceplate is visible and accessible on wall 21, while the assembly housing is configured behind the faceplate within the interior of the wall. The faceplate and concealed housing therefore give the assembly a flush front surface relative to the corresponding wall and a pleasing overall appearance, while also protecting the components of the disclosed assembly.

The faceplate can have any desired length and/or width. For example, the faceplate can include length 27 and/or width 28 of about 3-8 inches (e.g., at least/no more than about 3, 3.5, 4, 4.5, 5, 5.5, 6, 6.5, 7, 7.5, or 8 inches). The term "length" refers to the longest horizontal distance of the faceplate. The term "width" refers to the longest vertical distance of the faceplate, such as in the use position. Faceplate 25 can also include thickness 29 of about 0.1-0.4 inches (e.g., at least/no more than about 0.1, 0.2, 0.3, or 0.4 inches). The term "thickness" refers to the distance between the front and opposed rear faces 2, 3 of the faceplate, as shown in FIG. 2c. However, the faceplate is not limited and can have any desired dimensions.

Faceplate 25 can be constructed from any desired material, such as (but not limited to) plastic, metal, glass, stone, ceramics, and the like. Optionally, the faceplate can include one or more aesthetically pleasing features. For example, front face 2 of the faceplate (e.g., the surface that the user sees and interacts with) can have any desired color, pattern, decorative shape, or combinations thereof.

Figure 3D:
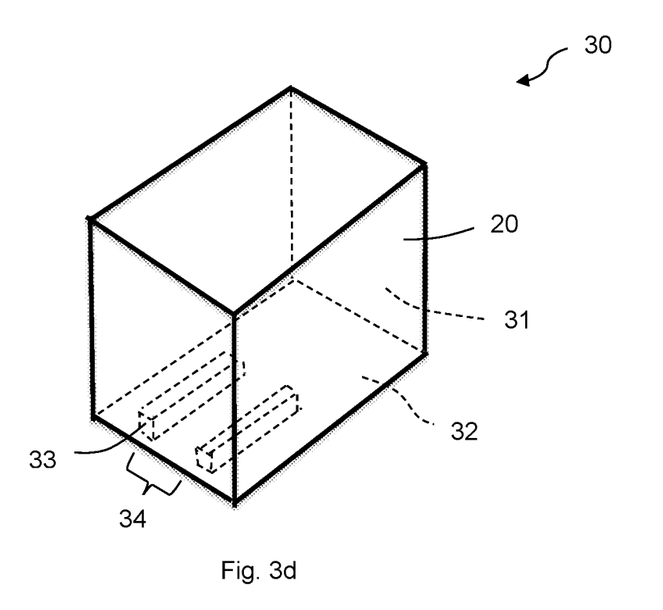
FIG. 3d is a rear perspective view of an outlet assembly housing in accordance with some embodiments of the presently disclosed subject matter.

A shown in FIG. 3d, bottom face 32 of the housing includes one or more supports 33 that provide a foundational surface for at least one insert. In addition, channels 34 are formed between adjacent supports. The channels act as passageways, allowing the first end of a charging cable to reach a corresponding device port, as described below. Channels 34 and/or supports 33 can have any desired size and/or shape.

While configured as rectangular in shape, housing 30 can have any desired configuration. The housing can be constructed from any durable material, such as (but not limited to) plastic, metal, wood, or combinations thereof.

The assembly housing typically includes a mounting bracket (or some other attachment element) that allows the housing to be attached to the supporting wall. However, this is not required.

Figure 4A:
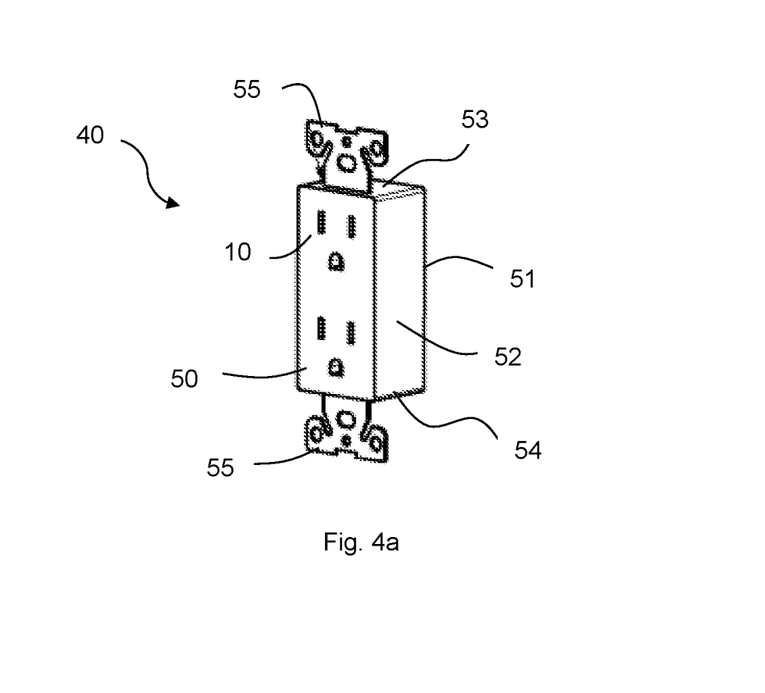
FIG. 4a is a perspective view of an assembly electrical outlet module in accordance with some embodiments of the presently disclosed subject matter.
Figure 4B:
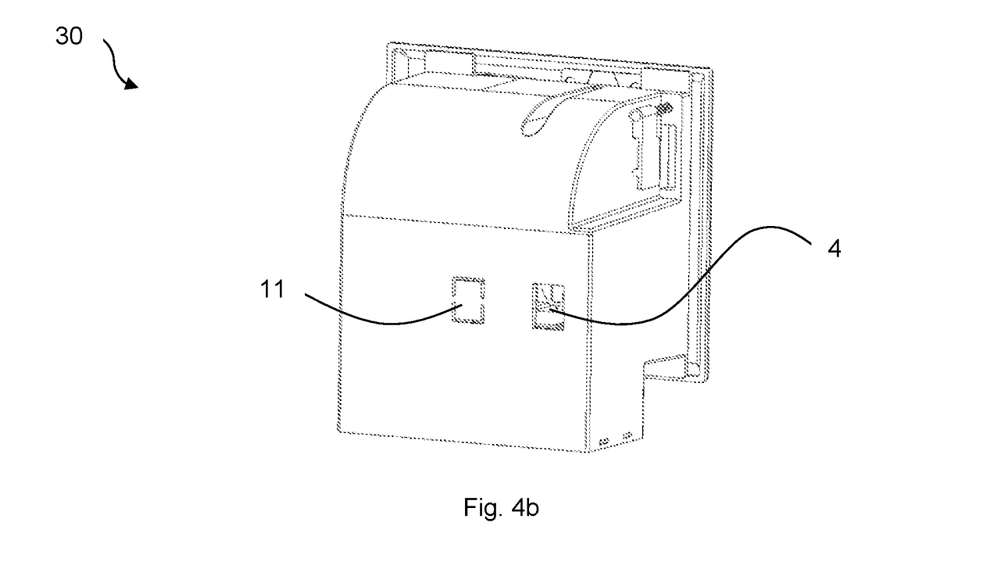
FIG. 4b is a perspective view of the rear face of a housing comprising a plurality of outlets to allow wiring to pass therethrough.

FIG. 4a illustrates one embodiment of an electrical receptacle 40 comprising one or more sockets, adapted to be mounted within housing 30. The socket module provides one or more AC (alternating current) receptacles 10 accessible via faceplate opening 35a. The AC receptacles are conventional connectors that accept the prongs of inserted plugs and deliver current to AC powered equipment. Power is supplied to the electrical socket module via a standard connection to a power grid (such as being hard wired to a building electrical circuit). In some embodiments, the rear face of the housing includes at least one aperture 4 that allows wiring to run from the power grid to attach to the terminals of the socket. In some embodiments, wiring can be connected to the AC/DC converter, and then to the socket and/or charging cable 20, thereby providing power. The wiring is secured to the terminals of the socket, as would be known in the art. FIG. 4b illustrates one embodiment of the rear face of the housing comprising apertures 4. Each aperture can include removable cut-out 11 that can be easily punctured to expose the aperture so that wiring can pass into/from the housing, as shown.

The electrical housings are therefore retained within first compartment. For safety, receptacle 10 can optionally include a grounded conductor to reduce the risk of injury or death by electric shock. In some embodiments, each receptacle 10 can provide up to 15 amperes and 125 volts of electricity to inserted plugs. However, the presently disclosed subject matter is not limited and each receptacle can provide greater or less than about 125 volts of electricity.

Although FIG. 4a illustrates a North American 15 A/125 V (NEMA-5) grounded AC electrical receptacle, it should be noted that any AC electrical plug configuration can be utilized. Further, the type of electrical receptacle can be dictated by the country and national standards legislation present therein. For example, suitable AC electrical plug configuration can be NEMA-1, JIS C 8303, Class II, CEE 7/16, CEE 7/17, BS 4573, BS 546, or any other AC electrical plug configuration capable of providing AC electricity.

As shown in FIG. 4a, receptacle 40 can include front face 50 (adjacent to faceplate 25) and opposed rear face 51. The outlet can further include sidewalls 52, and top and bottom faces 53, 54. Further, any type of connector 55 can be used to permanently or releasably attach the receptacle to the housing. Such mechanisms are well known in the art.

Figure 5A:
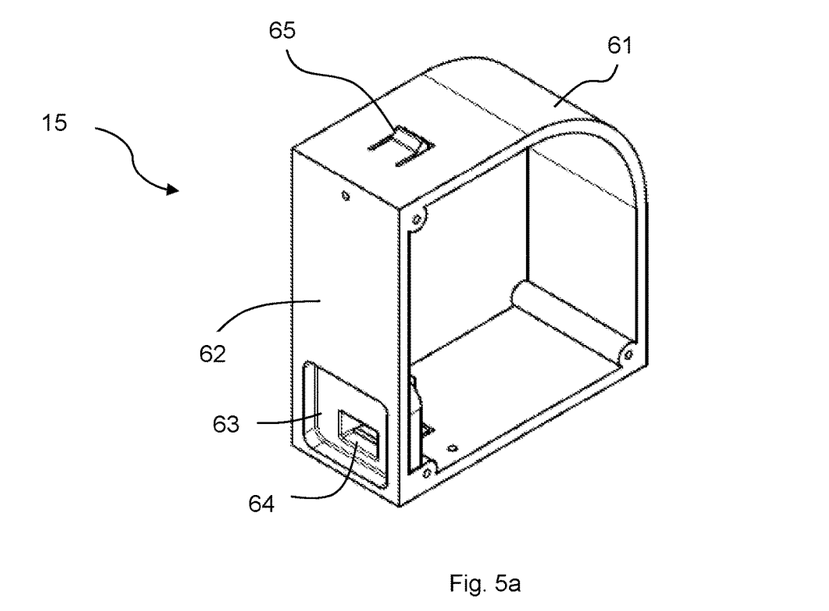
FIG. 5a is a perspective view of an outlet assembly insert in accordance with some embodiments of the presently disclosed subject matter.
Figure 5B:
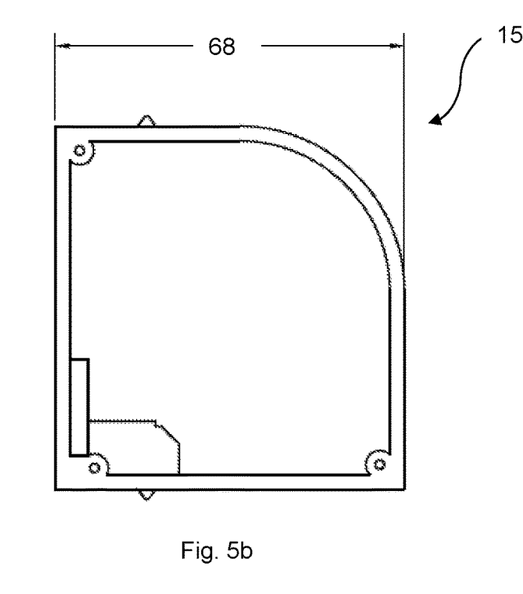
FIG. 5b is a side plan view of the insert of FIG. 5a in accordance with some embodiments of the presently disclosed subject matter.
Figure 5C:
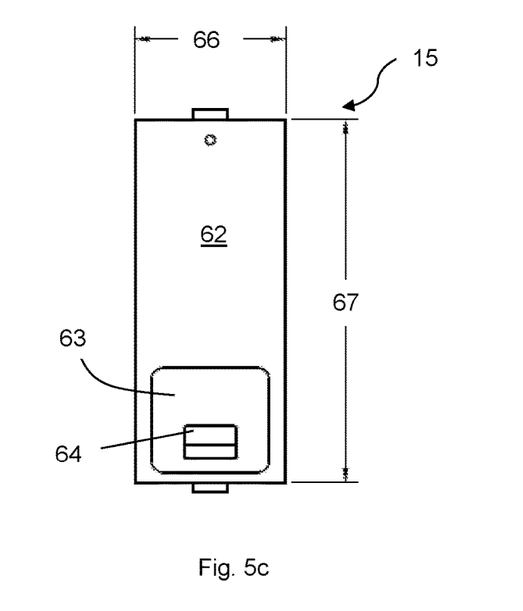
FIG. 5c is a front plan view of the insert of FIG. 5a in accordance with some embodiments of the presently disclosed subject matter.

In addition to receptacle 40, the interior of housing 30 also includes one or more inserts 15 positioned therein. One embodiment of insert 15 is illustrated in FIGS. 5a-5c. As shown, each insert includes outer cover 61 that protects the insert interior components. The term "cover" includes any element that reels, encloses, and/or protects an interior spool and cable. The cover includes front face 62 that is accessible through housing aperture 35b. The front face of the cover includes opening 63 defined by slot 64 through which the connective end of a USB cable (or any other desired cable) is extended. The cover also include interior configured to retain a spool of cable as described below.

In some embodiments, insert 15 is permanently configured within the housing. However, the insert can be configured to be removably positioned within the housing using conventional mechanisms such as magnets, clips, fasteners, snap-fit attachment, pressure-fit attachment, and the like. For example, clip 65 can be used to slide insert 15 into the interior of the housing and retain it in place. When desired, a user can apply light pressure to remove the insert from the housing. In this way, a user can therefore replace the insert if desired. For example, a second insert with a different length of charger wiring can replace a first insert. Alternatively, a different style charger insert can be used to accommodate a new phone or device with different charging requirements.

Each insert can have length 66 of about 0.5-3 inches (e.g., at least/no more than about 1, 1.25, 1.25, 1.75, 2, 2.25, 2.5, 2.75, or 3 inches). The insert can include width 67 of about 2-5 inches (e.g., at least/no more than about 2, 2.5, 3, 3.5, 4, 4.5, or 5 inches). Insert 15 can further includes thickness 68 of about 1-5 inches (e.g., at least/no more than about 1, 1.5, 2, 2.5, 3, 3.5, 4, 4.5, or 5 inches). It should be appreciated that the dimensions of inserts 15 are not limited and have any desired length, width, and/or thickness.

Figure 5D:
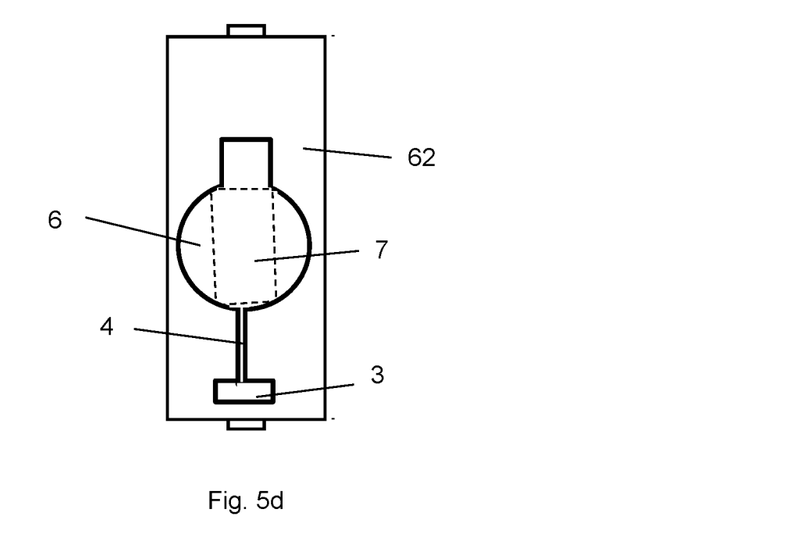
FIG. 5d is a front plan view of an insert with a device charging end retention element in accordance with some embodiments of the presently disclosed subject matter.
Figure 5E:
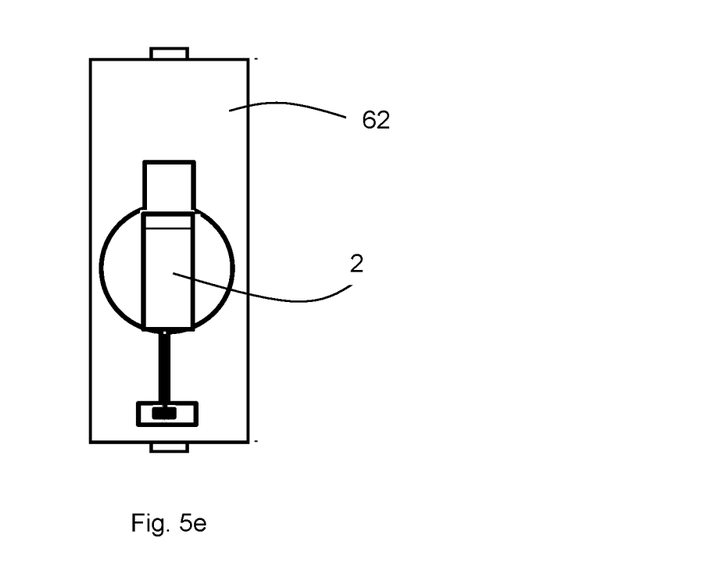
FIG. 5e is a front plan view of the insert of FIG. 5d with a cable charging end attached in accordance with some embodiments of the presently disclosed subject matter.

FIG. 5d illustrates one embodiment of a holder that can be configured on the front face 62 of the insert. The holder can be configured to releasably retain the charging end of a cable. The holder can have any desired configuration, such as an indentation 7 that allows the charging end to be releasably attached. However, any mechanism can be used, such as (but not limited to) clips, fasteners, VELCRO®, ties, magnets, and the like. For example, the holder can include opening 3 in fluid connection to channel 4 sized and shaped to allow a cord to pass through from the spool and then be retained within the channel, as shown in FIG. 5e. The charging end 2 can be retained in holder main body 6 which includes an indentation or other mechanism to hold the charging end.

Figure 6A:
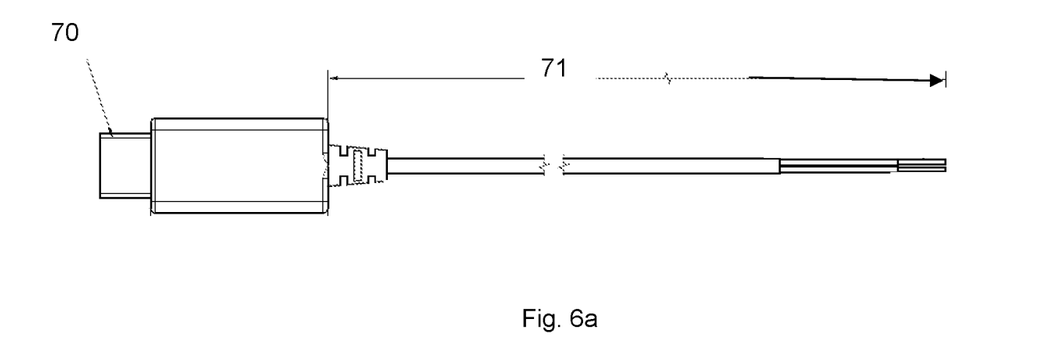
FIG. 6a is a top plan view of a conventional USB cable in accordance with some embodiments of the presently disclosed subject matter.
Figure 6B:
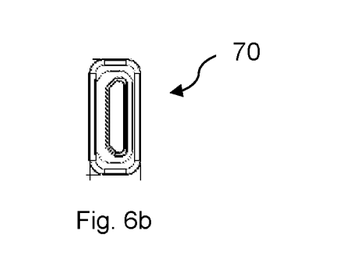
FIG. 6b is a front plan view of a USB connector in accordance with some embodiments of the presently disclosed subject matter.

FIGS. 6a and 6b illustrate one embodiment of representative charging cable 20. As shown, the cable can be configured as a micro-USB Type B cable comprising connector 70 (power only) and cord length 71. Connector 70 can be releasably attached to a device (e.g., a phone), providing charging capabilities. Length 71 can be stored within insert 15 when the cable is not in use. However, length 71 can be removed from the insert interior through slot 64 as needed by the user. The slot therefore allows a length of charging cable 20 to slide through the wall and out to the exterior environment so that the cable can be accessed by a user. However, the slot is small enough that connector 70 cannot fit through the slot and is maintained external to cover 31. The USB cable is therefore both externally accessed and internally stored. The size of slot 64 can be designed according to the size of a corresponding cable and connector 70. In some embodiments, the cover can include a mount to protect connector 70 from freely swinging and becoming damaged.

Figure 6C:
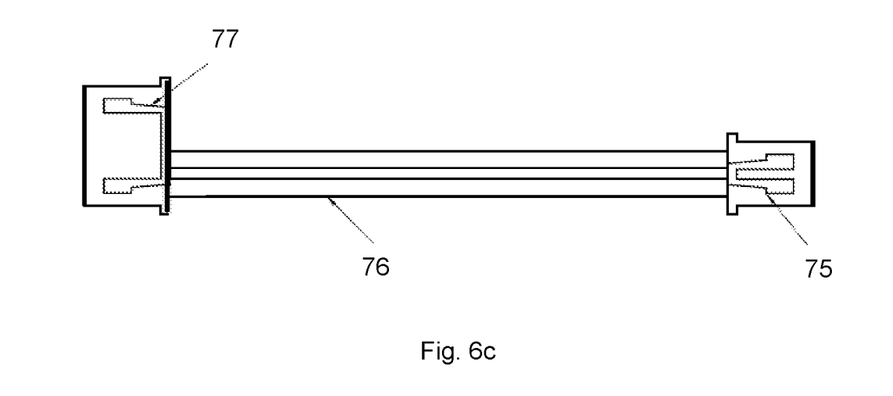
FIG. 6c is a top plan view of a 2-pin female connector cable in accordance with some embodiments of the presently disclosed subject matter.

It should be appreciated that any desired cable can be used. For example, FIG. 6c illustrates one embodiment of a 2-pin female connector 75 (e.g., of the type manufactured by JST Sales of America, Model XHP-2). The cable can include 2 jumper lead wires 76 (22 AWG) socket to socket ends. The lead wires can connect cables to only two terminals directly next to each other on either the left or right side of the 4-pin female connector 77.

Figure 6D:
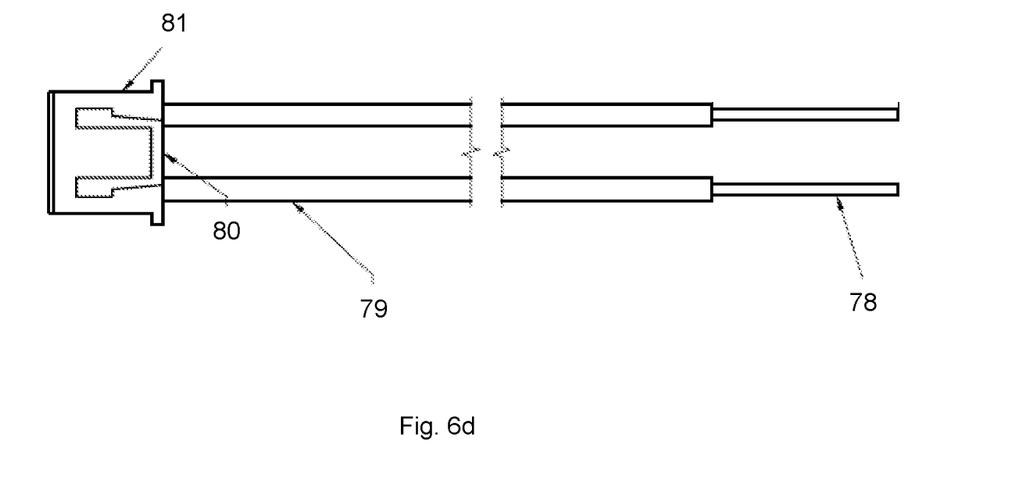
FIG. 6d is a top plan view of a cable with stripped ends and a pair of jumper lead wires in accordance with some embodiments of the presently disclosed subject matter.

FIG. 6d illustrates an embodiment of cable 20 with stripped ends 78 and a pair of jumper lead wires 79 (22 AWG) socket to socket (of the type manufactured by JST Sales America, Model No. ASXZHSXH22K203). As shown at 80 no wire is installed in the center connector slot. The cable includes a 3-pin female connector 81.

Figure 6E:
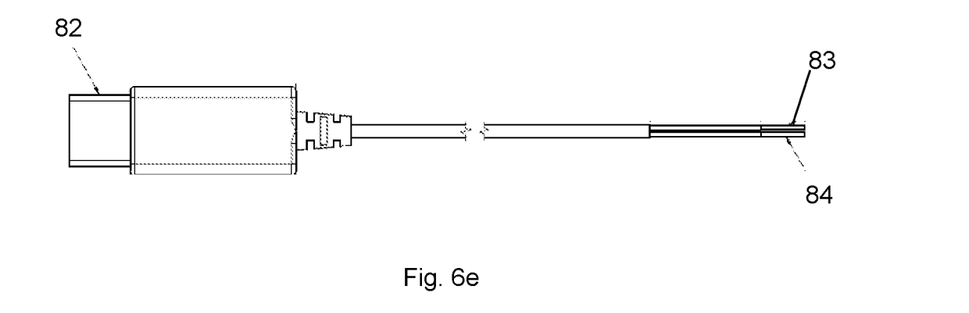
FIG. 6e is a top plan view of a USB Type C cable connector in accordance with some embodiments of the presently disclosed subject matter.
Figure 6F:
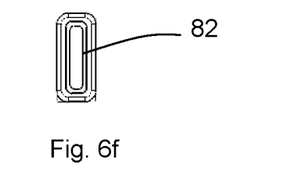
FIG. 6f is a front view of a USB Type C connector in accordance with some embodiments of the presently disclosed subject matter.

FIGS. 6e and 6f illustrate one embodiment of cable 20 configured with USB type C connector 82 and tinned magnet wires 83. The cable can include insulation resistance of about 10 MOhm/300 VDC. In some embodiments, the minimum number of pins may be preferred to for the USB Type C connector to allow for power transfer and to reduce costs. The cable can include first conductor 83 connected to power (which can be red in some embodiments) and second conductor 84 connected to ground (GND) (which can be black in some embodiments).

Thus, cable 20 can be configured as a USB (Universal Serial Bus) port, mini-USB port, micro-USB port, micro USB-C, lightning connector, etc. The term "USB port" refers to an industry standard interface port. Mini and Micro-USB ports are smaller than conventional USB ports. The term "lightning connector" refers to a computer bus and power connector used to connect Apple® mobile devices (e.g., iPhones®, iPads®, iPods®, etc. to host computers, external monitors, camera, USB battery chargers, and other peripherals).

Each receiving port operates independently from the electrical socket module and from adjacent receiving ports. Each receiving port therefore functionally includes its own power supply and can be configured to supply about 1-5 volts, providing constant and isolated power as requested by a connected device. However, it should be appreciated that the receiving port can supply greater than 5 volts of electricity in some embodiments.

Figure 7A:
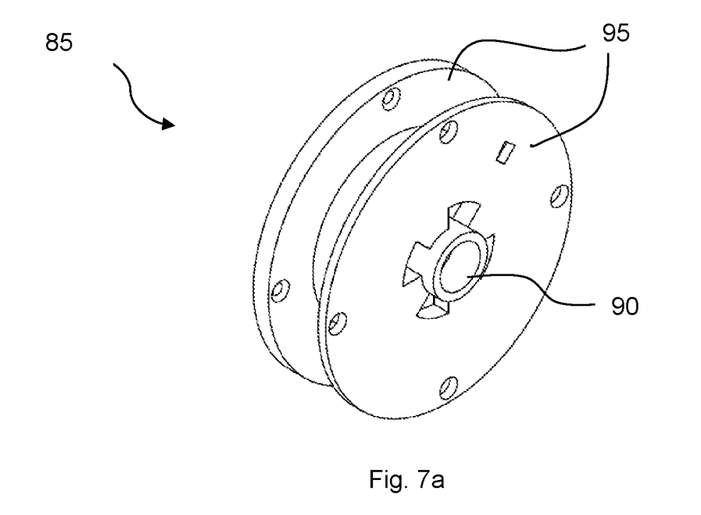
FIG. 7a is a perspective view of an insert spool in accordance with some embodiments of the presently disclosed subject matter.
Figure 7B:
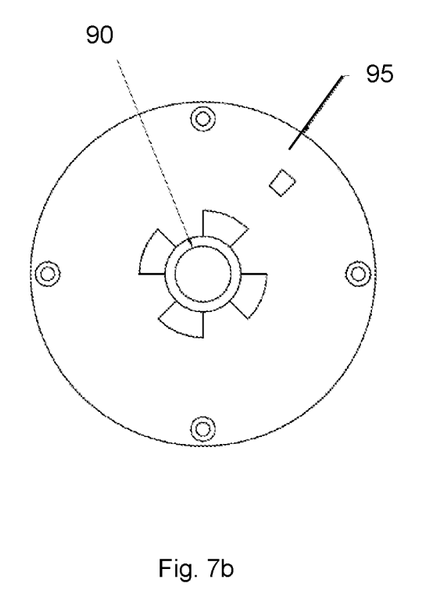
FIG. 7b is a top plan view of an insert spool in accordance with some embodiments of the presently disclosed subject matter.
Figure 7C:
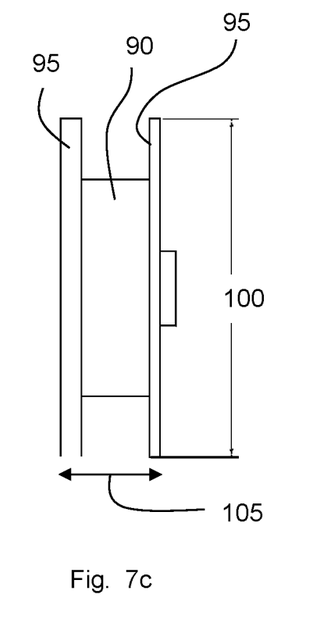
FIG. 7c is a side plan view of an insert spool in accordance with some embodiments of the presently disclosed subject matter.

Within the interior of cover 31, a length of cable 20 is wound around spool 85 positioned within the interior of insert 15. The spool can retain any desired amount of cable, such as about 1 foot, 5 feet, 10 feet, or more. The term "spool" refers to a cylinder around which a cable can be wound (e.g., a reel). Spool 85 can have any desired configuration. For example, the spool can include inner cylinder 90 and two opposing ends 95 with a diameter larger than the cylinder to enable a length of cable to be wound around the cylinder, as shown in the embodiment of FIGS. 7a-7c. However, the presently disclosed subject matter is not limited and the spool can have any configuration.

In some embodiments, spool 85 can include diameter 100 of about 1-5 inches (e.g., at least/no more than about 1, 1.5, 2, 2.5, 3, 3.5, 4, 4.5, or 5 inches). The spool can also include thickness 105 (e.g., the distances between the two opposing ends 95) of about 0.25-2 inches (e.g., at least/no more than about 0.25, 0.5, 0.75, 1, 1.25, 1.5, 1.75, 2 inches). However, the spool can be configured with any desired diameter and/or thickness.

Cable 20 is wound around the spool and can be stored until use, with the connector end maintained external to the insert cover and extending through slot 64. The plug end of cable 20 (at the end opposing the connector end) extends through a notch in the cover and travels through channel 34 to access a port or power supply in the wall or a separate power supply (such as a converter) or battery. Thus, one end of a power cord can be coupled to the converter via an opening in the rear face of the housing. The opposite end of the charging cord includes a plug that is configured to be inserted into a device for charging.

In some embodiments, cable 20 is retractable. The term "retractable" refers to the ability of the cable to extend from spool 85 upon stretch (e.g., a pulling force from a user) and retract back onto the spool upon release. Any known retractable mechanism can be used. For example, spool 85 can include a spiral spring that provides a retraction force for rotating the spool. In this way, extended cable 20 can be retracted back into the insert interior (e.g., rewound around the spool). Thus, the retracting mechanism allows cable 20 to be unwound from spool 85 when the cable is pulled or extended away from housing 30 through slot 64. When a desired length of cable has been extended away from the housing, the retracting mechanism can be locked into place. For example, if a user needs 2 feet of length of cable, 2 feet can be unwound from spool 85 and locked into place. In some embodiments, the spool can lock when a user stops pulling cable 20 from the housing. A user can unlock the retracting mechanism by pulling cable 20 beyond the locked position and releasing the tension caused by pulling the cable beyond the locked position. A spring or tension mechanism can be used to retract the cable into the interior of insert 15 (e.g., around spool 70) for storage and concealment.

For example, the retracting mechanism can include a wheel with one or more teeth positioned around at least a portion of the wheel circumference. The wheel can be positioned around the axle of spool 85. A locking component can engage with the teeth to lock the wheel into place (and thus retract cable 20). The wheel in combination with a coiled spring or any other tension mechanism can allow the cable to be locked into a desired position. It should be appreciated that the presently disclosed subject matter is not limited to configurations that include a wheel and spring. Rather, any known elements that can retract and/or lock cable 20 can be used.

Insert 15 is positioned within housing 30 using any known mechanism, such as (but not limited to) clip 65. For example, magnets, hook-and-loop closure, pressure fit attachment, snap-fit attachment, and/or the use of mechanical elements (clips, fasteners, screws, bolts, etc.) can be used. In this way, replacement of the insert components (e.g., spools and cables) can be easily accomplished.

As mentioned above, in some embodiments the insert can be removed from housing 30 and interchanged with a different insert (e.g., one with a different spool). Alternatively, spool 85 can be removed from the insert or housing and replaced with a corresponding replacement spool. The replacement spool can include the same type of charging cable or can differ from the original cable with regard to length, type, and the like.

Assembly 5 can include any number of inserts (and thus any number of cables 20), such as about 1-10. For example, an assembly that includes 2 inserts will allow a user to charge two devices at the same time. It should be appreciated that the presently disclosed subject matter is not limited and assembly 5 can have greater than 10 inserts, depending on market requirements.

In use, assembly 5 can be customized by providing one or more inserts and/or socket receptacles as desired by the user. One or more desired inserts 15 can be added to housing 30. Specifically, each insert can include any suitable charging cable to accommodate a desired device (e.g., an iPhone®, Android®, gaming assembly, tablet, PDA, etc). The plug end of the cable exits each insert 15 and is connected to a receiving port located in the wall or in a converter via channel 34. The housing can then be recessed into wall 21. Connector 75 of each cable extends through cover slot 65 of the insert to allow access by a user. Faceplate 25 can then be added over the housing to create a flush appearance to wall 21.

One or more connective charging ends of the assembly are therefore available and accessible by the user when needed. In addition, sockets 10 are also available when electrical connection is needed (e.g., by plugging the prongs of an electrical device into the outlet).

Figure 8:
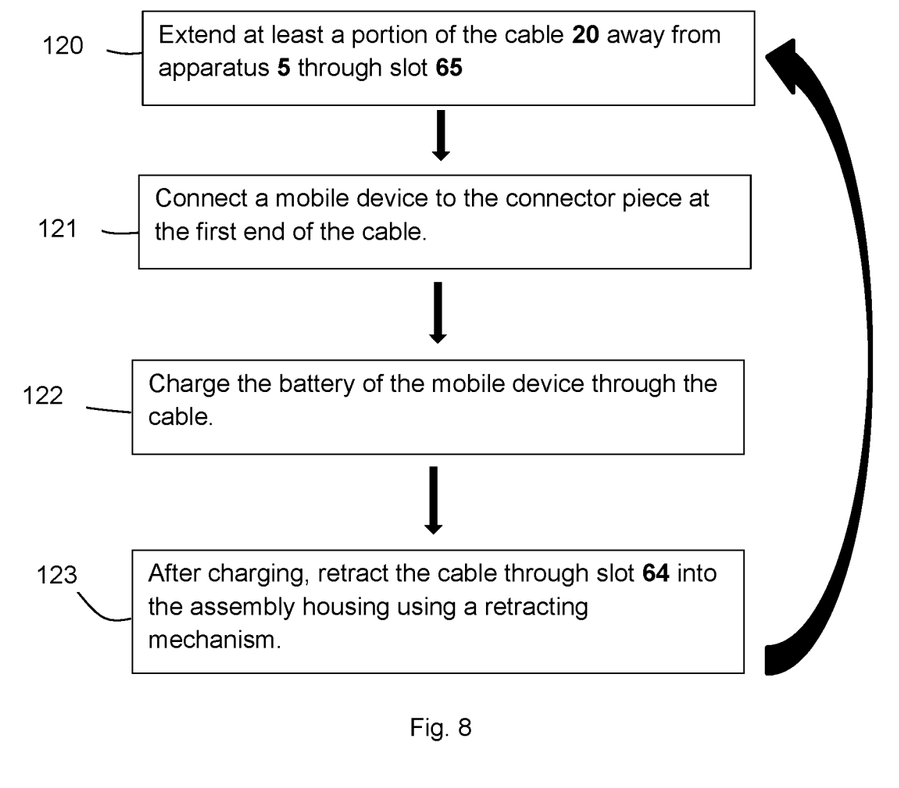
FIG. 8 is a schematic illustrating one way of using the outlet assembly in accordance with some embodiments of the presently disclosed subject matter.

For example, when the USB charging cable is in use, the cable connector can be grasped by the user and a light pressure is applied, as shown in step 120 of FIG. 8. In response to the pressure, a length of the cable is unwound from spool 85. After a desired amount of cable has been extended from the housing, the user ceases pressure to lock the cable in position. The connector can then be releasably attached to a device to be charged at steps 121 and 122.

After a desired amount of time, the user can detach the connector from the associated device. The cable can then retract around spool 85 to the storage position, leaving the connector accessible for later charging at step 123. The steps can be repeated as needed to charge multiple devices.

The disclosed assembly offers many advantages over prior art systems. For example, because an electronic assembly can be charged via one or more cables 20, no separate chargers are required. Accordingly, users are no longer required to carry around bulky chargers when they travel or leave home.

The disclosed assembly can be customized by a user, such as by replacing each charging insert with a different type of charging cable.

Assembly 5 therefore eliminates the need for all external accessories for charging a device. The user does not need a separate cable because the circuitry included within the disclosed assembly can charge any combination of devices, such as phones, tablets, gaming devices, and the like.

The disclosed wall outlet with integrated charge circuitry is therefore capable of charging most devices sold today. The cable can be easily retracted into the wall assembly for storage when not in use.

If a user forgets or loses a charger, the corresponding device can still be easily and conveniently charged using assembly 5.

Assembly 5 can be easily retrofitted to existing outlet designs. For some examples, wall aperture 22 can be enlarged as needed to fit the assembly.

Further, the disclosed assembly can be customized to accommodate two (or more) different charging mechanisms. For example, the assembly can be customized to include a first spool of cable suitable to charge an iPad® and a second spool of cable suitable to charge an Android® phone.

Assembly 5 provides a streamlined look to a surrounding environment, eliminating the cluttered look of adaptors and cords.

The presently disclosed subject matter is not limited to the embodiments set forth herein. It will be understood that modifications and variations are encompassed within the spirit and scope of the invention. Accordingly, the invention is limited only by the following claims.

What is claimed is:

1. An outlet assembly comprising:
    a housing comprising:
        an interior;
        a front face defined by one or more socket apertures and one or more insert apertures;
        a wall that divides the housing into a socket compartment and an insert compartment;
        a bottom face comprising one or more housing supports spaced to create a channel therebetween;
    a socket positioned within the socket compartment of the housing, defined by one or more AC sockets, wherein each socket is adjacent to a corresponding socket aperture;
    an insert positioned within the insert compartment of the housing, wherein the insert is defined by one or more spools each with a length of charging cable wound therein, wherein each insert comprises a front face adjacent to a corresponding insert aperture, and wherein each insert is positioned on top of the corresponding housing supports, and wherein the front face of each insert includes an opening comprising a slot that extends into an interior of the insert;
    wherein each cable includes a plug that is operably connected to a power source to provide power to the cable;
    wherein the cable has a length of about 5 to 10 feet; and
    wherein each cable includes a connector end configured to releasably attach to a mobile device that is positioned external to the housing, extending through the insert front face slot, and wherein the connector end extends through the slot and opening on the front face of the insert.

2. The outlet assembly of claim 1, wherein the housing is positioned within a wall, such that that the housing front face is flush with the wall and the remainder of the housing is concealed within an interior of the wall.

3. The outlet assembly of claim 1, wherein each AC socket provides about 110 volts of electricity.

4. The outlet assembly of claim 1, wherein the connector end is a standard USB port, mini-USB port, micro-USB port, micro USB-C port, USB-C port, lightning connector, or combinations thereof.

5. The outlet assembly of claim 1 wherein each connector end operates independently from each AC socket.

6. The outlet assembly of claim 1, wherein each connector end supplies about 1-5 volts of electricity.

7. The outlet assembly of claim 1, wherein each spool is a retractable spool that allows the associated cable to be extended from the spool and retracted back to the spool.

8. The outlet assembly of claim 7, wherein the spool includes a locking mechanism that enables the cable to be locked in an extended and unwound configuration.

9. The outlet assembly of claim 1, further comprising an AC/DC converter that provides power to the socket or the charging cable, or the socket and the charging cable.

10. The outlet assembly of claim 1, further comprising a circuit board that provides power to the charging cable.

11. The outlet assembly of claim 1, wherein each spool is configured to be independently attached or removed from the housing assembly.

12. The outlet assembly of claim 1, wherein the insert housing supports form a charging cable channel positioned on a bottom face of the insert.

13. A method of charging a mobile device with an outlet assembly, the method comprising:
    connecting a charging input of the mobile device with a connector from the outlet assembly, wherein the outlet assembly comprises:
        a housing comprising:
            an interior;
            a front face defined by one or more socket apertures and one or more insert apertures;
            a bottom face comprising one or more supports spaced to create a channel therebetween;
        a socket module positioned within the interior of the housing, defined by one or more AC sockets and a sidewall comprising one or more ports, wherein each socket is adjacent to a corresponding socket aperture;
        an insert positioned within the interior of the housing, defined by one or more cables wound about a spool, wherein each insert comprises a front face adjacent to a corresponding insert aperture, and wherein each insert is positioned on top of the housing supports and wherein the front face of each insert includes an opening comprising a slot that extends into an interior of the insert;
        wherein each cable includes a connector end configured to releasably attach to a mobile device that is positioned external to the housing, extending through an insert front face slot; and
        wherein the connector can be extended up to about 5 to 10 feet from the outlet assembly;
    charging the mobile device for a desired amount of time;
    removing the connector from the charging input of the mobile device, whereby the mobile device is charged.

14. The method of claim 13, wherein the mobile device is selected from a smart phone, a tablet, a gaming device, a PDA, or combinations thereof.

15. The method of claim 13, wherein a plurality of mobile devices can be simultaneously charged.

16. The method of claim 13, wherein the outlet assembly is configured in a wall.

17. The method of claim 13, wherein each spool is a retractable spool that allows the associated cable to be extended from the spool and retracted back to the spool.

18. The method of claim 13, wherein the spool includes a locking mechanism that enables the cable to be locked in an extended and unwound configuration.

19. The method of claim 13, wherein the device can be charged simultaneously with the use of the AC socket.

20. An outlet assembly comprising:
    a housing comprising:
        an interior;

a front face defined by one or more socket apertures and one or more insert apertures;

a wall that divides the housing into a socket compartment and an insert compartment;

a bottom face comprising one or more housing supports spaced to create a channel therebetween;

a socket positioned within the socket compartment of the housing, defined by one or more AC sockets, wherein each socket is adjacent to a corresponding socket aperture;

an insert positioned within the insert compartment of the housing, wherein the insert is defined by one or more spools each with a length of charging cable wound therein, wherein each insert comprises a front face adjacent to a corresponding insert aperture, wherein each insert is positioned on top of the corresponding housing supports that form a charging cable channel on a bottom face of the insert;

wherein each cable includes a plug that is operably connected to a power source to provide power to the cable;

wherein the cable has a length of about 5 to 10 feet; and wherein each cable includes a connector end configured to releasably attach to a mobile device that is positioned external to the housing, extending through the insert front face slot, and wherein the connector end extends through the slot and opening on the front face of the insert.

* * * * *